US008186084B2

(12) United States Patent
Brown

(10) Patent No.: US 8,186,084 B2

(45) Date of Patent: May 29, 2012

(54) NOZZLE DISPLAY

(75) Inventor: Robin J. Brown, Labadie, MO (US)

(73) Assignee: Husky Corporation, Pacific, MO (US)

( * ) Notice: Subject to any disclaimer, the term of this patent is extended or adjusted under 35 U.S.C. 154(b) by 3 days.

(21) Appl. No.: 12/462,449

(22) Filed: Aug. 4, 2009

(65) Prior Publication Data

US 2010/0223826 A1 Sep. 9, 2010

Related U.S. Application Data

(63) Continuation-in-part of application No. 29/314,103, filed on Mar. 3, 2009, now Pat. No. Des. 626,600.

(51) Int. Cl.
*G06F 3/18* (2006.01)

(52) U.S. Cl. ............................... 40/661; 141/98; 222/23

(58) Field of Classification Search ............... 40/299.01, 40/661; 141/98; 222/23
See application file for complete search history.

(56) References Cited

U.S. PATENT DOCUMENTS 2,800,931 A 7/1957 Sutcliffe
4,010,781 A 3/1977 Sutcliffe
4,465,209 A * 8/1984 Wilder ............................ 222/23
5,058,637 A 10/1991 Fell
5,184,655 A * 2/1993 Fell ............................... 141/392
5,450,681 A * 9/1995 Stolzman ......................... 40/308
6,070,350 A * 6/2000 Fantone et al. ................. 40/454
6,112,782 A * 9/2000 Farthing ......................... 141/392
6,289,616 B1 * 9/2001 Alvern ........................ 40/299.01
6,516,540 B2 * 2/2003 Seydel et al. ..................... 36/29
6,745,508 B1 * 6/2004 Ngan ......................... 40/642.02
6,745,509 B1 * 6/2004 Lapp ............................... 40/661
6,783,028 B1 * 8/2004 Ambrose et al. ................ 222/23
7,255,142 B2 * 8/2007 Carder et al. ................. 141/392
2003/0150145 A1 * 8/2003 Kretzschmar ................... 40/538
2005/0160653 A1 * 7/2005 Regelin ........................... 40/771

* cited by examiner

*Primary Examiner* — Joanne Silbermann

*Assistant Examiner* — Christopher e. Veraa

(74) *Attorney, Agent, or Firm* — Paul M Denk

(57) ABSTRACT

A nozzle display for use for holding advertising is integrated into the structure of the nozzle guard, is elevated therefrom, but secured by tabs integrally into the plastisol forming the guard, with an expansive transparent cover holding the advertising material or placard in place upon the display base, and firmly adhering the ad to the base by means of the expandable lip of the cover as it tightly embraces the edges of the display base.

6 Claims, 4 Drawing Sheets

NOZZLE DISPLAY

CROSS-REFERENCE TO RELATED APPLICATIONS

This application is a continuation-in-part of the design patent application filed upon the same invention under Ser. No. 29/314,103 now U.S. Pat. No. Des. 626,600, dated Mar. 3, 2009, as filed in the United States Patent Office.

FIELD OF INVENTION

This invention relates to a nozzle display, and more particularly to a nozzle and scuff guard, that has attached thereto a point-of-purchase display means that allows for display of various indicia, whether it be the trademark, promotional information, instructions for use of the nozzle, or even advertising for others, that is readily oriented for convenient observance by the user of the nozzle to inform as to the information displayed.

BACKGROUND OF THE INVENTION

Nozzle guards have long been available in the prior art. Such guards are applied as a jacket for locating around the upper and forward regions of a nozzle, for the purpose of providing a cushioning against damage to the vehicle, into which the nozzle inserts, and provides a convenient wrap that may aid in maintaining the sanitation of the nozzle, where the wrap may be replaced, after repeated usage.

The upper surface of the nozzle has generally a capacity of area that may be utilized, either for displaying a message, as can be seen in the U.S. Pat. No. 5,058,637, by fitting a changeable message placard with a ceiling attachment, but such message display was normally provided similar to the size of the upper of the automatic shut-off, thereby limiting the extent to which any message may be provided for viewing thereat. One of the problems with the type of shown message display is that the pressure fitting by compression of the material forming the top surface either into its platform 16 or around said platform could easily come loose when rough handling of the nozzle occurs, or in the event the nozzle may be dropped during usage, or when it is inserted with some force into the neck of the automobile fill tank, or when the nozzle is replaced back into the holder of the dispenser. When the top surface falls loose, the message placard is likewise freed or dropped, and the display becomes useless for any further applications.

Other earlier embodiments in the form of nozzles and scuff guards can be seen in the prior patent to Sutcliffe, U.S. Pat. No. 2,800,931, which is one of the early guards for a nozzle, as can be noted. Another patent to G. G. Sutcliffe, U.S. Pat. No. 4,010,781, shows a related dispensing nozzle guard, but in this case, includes a spout enclosure for the vapor recovery nozzle. These two identified patents are owned by the same assignee as this current invention.

The concept of the current invention is designed to improve upon the technology as disclosed in these prior art.

SUMMARY OF THE INVENTION

The concept of this invention relates to improvements to the scuff guard for a fuel dispensing nozzle, and more particularly pertains to a point-of-purchase display that can be integrally molded for fastening to the scuff guard, as the scuff guard is formed for use in embracing a nozzle, and having the promotional display integrally formed therewith during its molding.

This invention contemplates the formation of a nozzle guard, of the type that conveniently and snugly embraces the upper and front regions of the nozzle, but makes use of that upper area of the guard that normally covers the valve that initiates automatic shut-off area of the nozzle, and integrally incorporates thereon a substantial sized point-of-purchase display that can be readily observed and viewed by the nozzle user, while dispensing fuel into his/her automobile or other vehicle. More specifically, these nozzle guards are generally molded from a polymer, in the category of a plastisol, and are readily accommodating to be molded in combination with other configurations, such as a point-of-purchase display, which in this embodiment, provides a display that is readily integrated into the jacket for the nozzle, and cannot be pried loose or lost, even during rough handling. More specifically, the point-of-purchase display is fabricated from a rigid material, whether it be metal, or molded from a hard plastic, and which includes integrally extending downward tabs, that can be coated and adhered directly to the upper surface of the scuff guard, as it is being molded, to thereby integrate a fully plastisol-coated display that is integrated into the structure of the guard, and thereby eliminates any potential for its removal, or loss, even during repeat or rough handling. The tabs extending downwardly from the display may be bent and configured to bring them into planer alignment with the intended upper surface of the guard, as it is molded or formed through repeat coatings of the plastisol, so that once the entire unit is formed, it is fully integrated together, with the point-of-purchase display becoming an inherent part of the guard, for ready application and usage. To the upper surface of the formed display may be applied a compression fit of a transparent cover, also molded of a flexible polymer, and which may have its advertising or other indicia located therein, and fully embraced by the expansive lip of the covering, so that once the covering is applied by means of its lip 2, the outer perimeter of the display, it is held in position quite firmly, and cannot be pried loose by any impact or motion generated during usage. Hence, various advertising, such as for soda, or other beverages, snacks, or other types of merchandise that may be readily available in a convenience store associated with the fuel dispensing can be promoted so as to whet the appetite of the nozzle user, to go into the store to purchase any displayed item, while paying for the dispensed fuel at that time. The expansive lip of the flexible covering can only be pried free through the use of excessive force, that needs to stretch the transparent covering at least along two dimensions, to be able to attain a removal of the covering, as when it may be necessary to replace any displayed indicia, whether it be outdated advertising, or to advertise new and different products, as may be desired.

It is, therefore, the principal object of this invention to provide a point-of-purchase advertising display that is of significant size so that greater and more advertising may be displayed, as an encouragement to the nozzle user to purchase additional items, while buying gasoline.

Another object of this invention is to provide a point-of-purchase display where all of its operative components are integrated into the structure of the nozzle guard, and thereby prevents any untimely or unauthorized removal or pilfering of the point of purchase display.

Still another object of this invention is to provide a sizeable surface for advertising that may be readily replaceable, at the desire and convenience of the convenience store and service station operator.

Another object of this invention is to provide a point-of-purchase display that is directly observable by the nozzle user, while dispensing gasoline.

Still another object of this invention is to provide a point-of-purchase display where even the cover may be integrated and attached by a living hinge to its base, so as to assure that no part of the display can be removed by an unauthorized person.

Still another object of this invention is to provide a point-of-purchase display where the advertising material may be slid into a slot operatively associated with the cover for the point-of-purchase display that may make it more convenient for the replacement of the advertisement, as may be desired.

These and other objects may become more apparent to those skilled in the art upon review of the invention as disclosed herein, and upon undertaking a study of the description of its preferred embodiment, in view of the drawings.

DESCRIPTION OF THE PREFERRED EMBODIMENT

Figure 1:
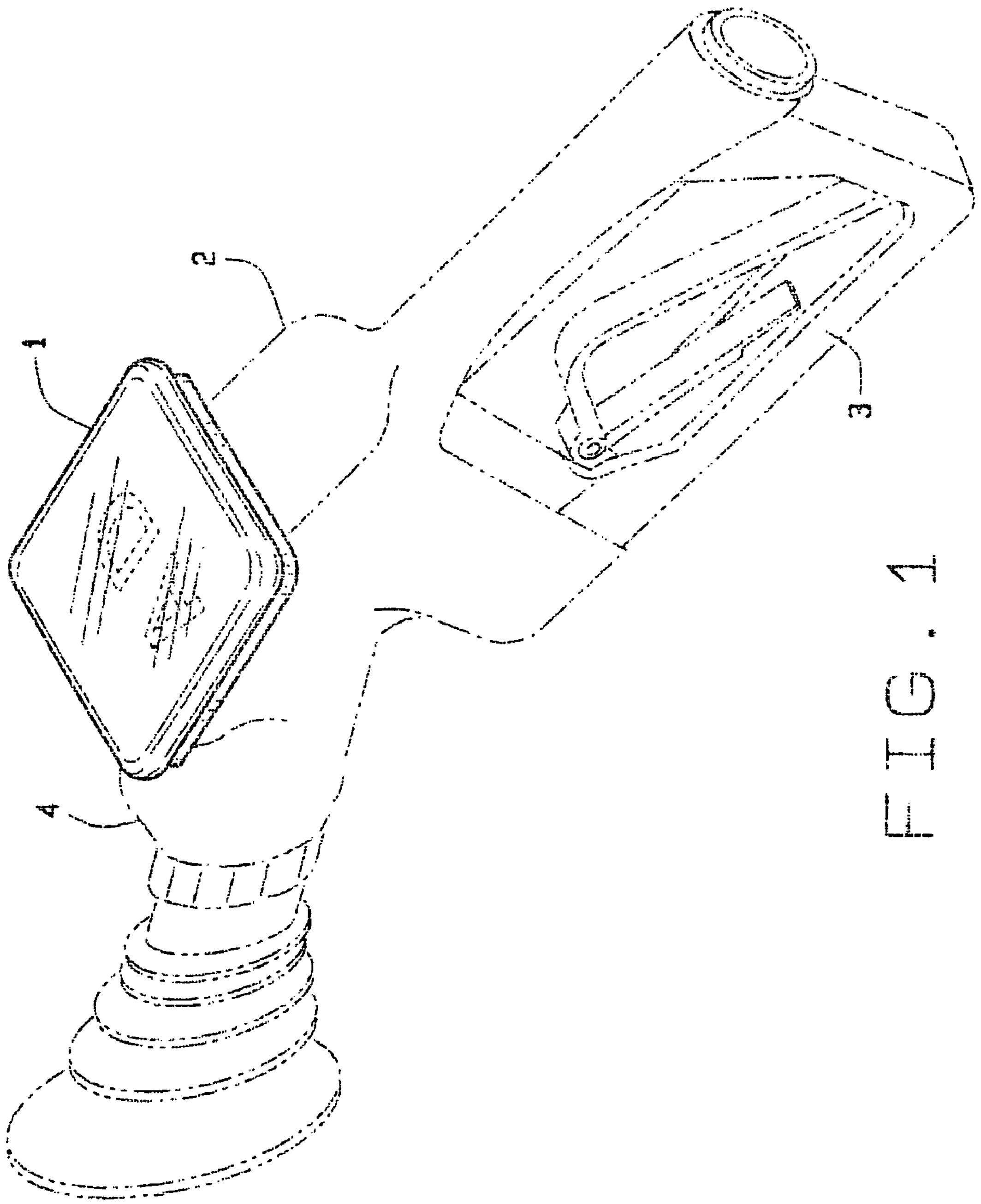
FIG. 1 provides an isometric view of the point-of-purchase display of this invention, as integrated into the structure of the nozzle scuff guard, the latter being shown with its embraced nozzle in phantom line.
Figure 2:
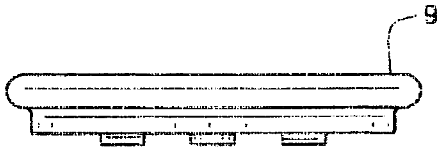
FIG. 2 is a front view of the advertising display of this invention.
Figure 3:
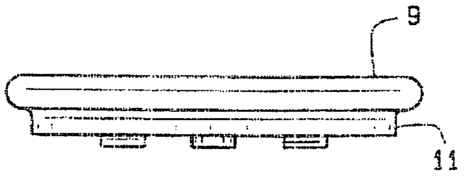
FIG. 3 is a rear edge view of the point-of-purchase display of this invention.
Figure 4:
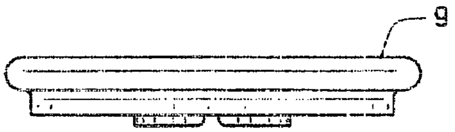
FIG. 4 is a right side view.
Figure 5:
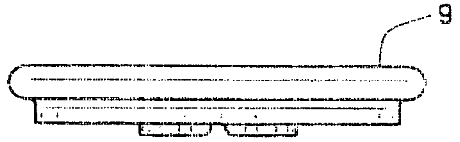
FIG. 5 is a left side view.
Figure 6:
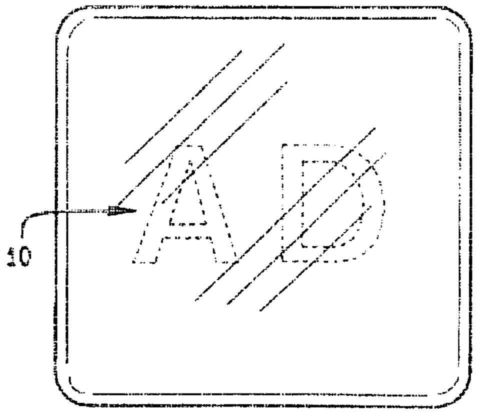
FIG. 6 is a top plan view of the advertising display and its transparent cover applied thereon.
Figure 7:
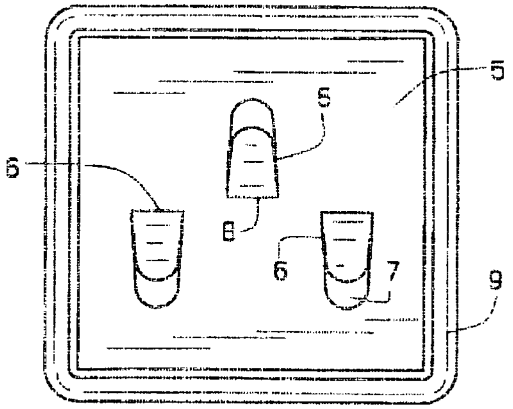
FIG. 7 is a bottom view of the advertising display, showing its connectable tabs before the platform and its tabs are integrated into the molded nozzle guard.
Figure 11:
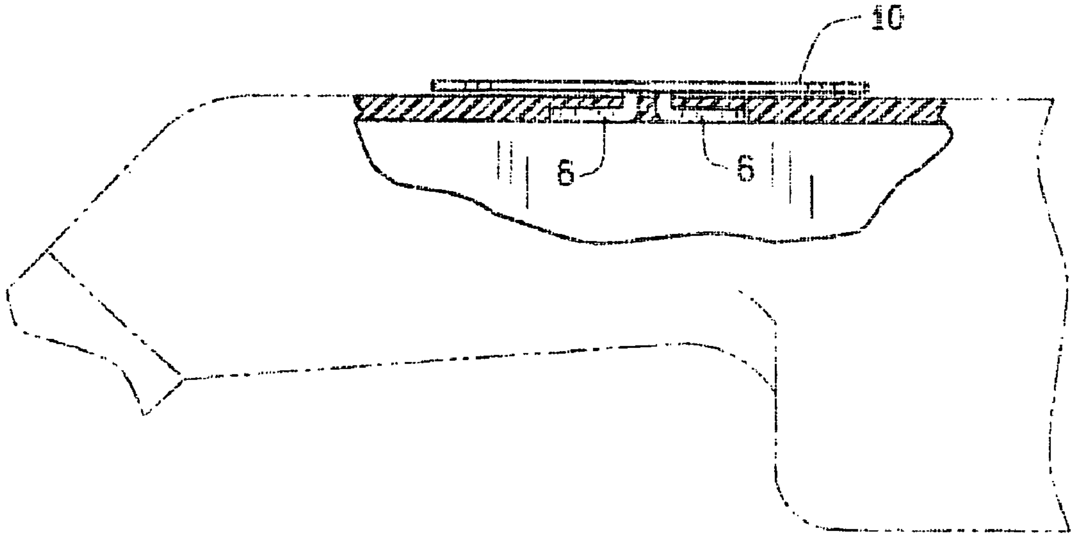
FIG. 11 shows the nozzle display of this invention integrated into the structure of the nozzle guard, during its molding, and showing, the display base tabs integrated into said nozzle guard.

In referring to the drawings, and in particular FIG. 1, there is shown the point-of-purchase advertising display 1 of this invention. It is integrated onto the formed nozzle guard 2, which has been applied about the upper and front segment of the nozzle 3, so as to cover the poppet valve area, the automatic shut-off region, and a part of the rear segment of the nozzle spout, as along the region 4. More specifically, the advertising display is formed to any configuration and shape, but herein is shown as a square or rectangle, as can be noted in FIGS. 2 through 7. It includes a display base 5 that has integrally formed therewith, and extending downwardly and horizontally a series of tabs, as at 6, and these tabs, as can be readily seen, are stamped from the platform or base 5, leaving the openings 7 within the base, as the tabs extend downwardly, and then horizontally in alignment with the formed base, in preparation for their integrally molding into the structure of the nozzle guard 2, during its formation. (See FIG. 11.) The tabs 6, at least along their perpendicularly bent edges 8, have sufficient height so as to slightly elevate the point-of-purchase display off of the upper surface of the nozzle guard, and to provide sufficient clearance for the application of a transparent cover 9 onto the base 5, for holding an advertisement, or other indicia, as can be seen at 10, upon the surface of the nozzle cover. As can be noted, the transparent cover 9 has a downwardly and inwardly extending integral lip 11, and since the cover is formed of a stretchable or expansive polymer, the lip can be pulled in various directions for expansion, and then slid over the ad placard 10, to hold it snugly against the base 5, once installed. Thus, the apron 11 of the cover can be stretched to allow for its embracement of the ad onto the base 5, and when released, the apron contracts inwardly, so as to hold the ad in place on the display base 5, when used.

Figure 8:
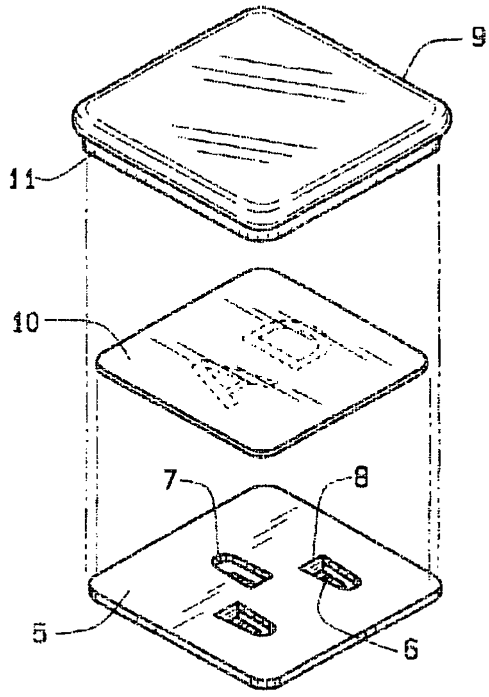
FIG. 8 is an exploded view of the point-of-purchase display platform, with the advertisement shown thereover, and the transparent cover upwardly therefrom, before they are all secured together.

These features for the tabs 6 with their perpendicular extension portions 8 can be readily seen in FIG. 8.

As can be readily noted, these tabs 6 are placed in close proximity with any mold upon which the nozzle guard is formed, whether it be formed by polymer molding, or plastisol coating onto the mold, so that as the nozzle guard is formed, these tabs and the display base 5 become integrally molded within the forming plastic, and become a permanent part of the nozzle guard, as it is formed.

Then, once the entire unit is formed, and it is placed upon a nozzle in application for its ready usage, all that need be done is to simply locate an advertising placard 10 upon the base 5, and then stretch and lower the transparent cover 9, onto the advertisement 10, and stretch its apron 11 about the edge of the base 5, until such time as the apron is released and locates under the base, to hold the cover and the ad firmly in place, and not easily removable.

As the tabs 6 are formed, they may be stamped from the material from which the base 5 is formed, which shows the arrangement of the formed aperture 7 for each base. Or, if the base 5 is formed of a plastic itself, the base 5, and its tabs, may be integrally molded, for ready usage and application.

Figure 9:
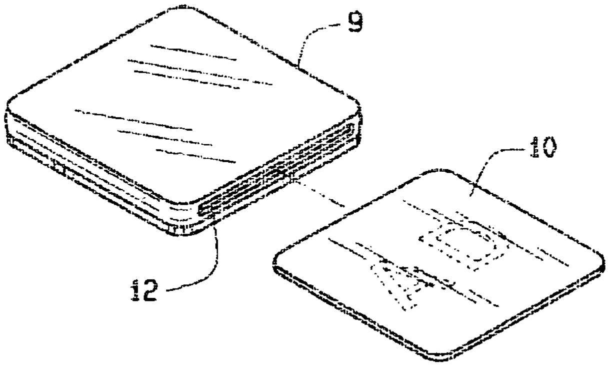
FIG. 9 shows an advertising display of this invention where the advertisement may be slid into a slot along one side edge of the cover.

FIG. 9 shows another method for application of an ad 10 to the transparent cover 9, by snugly locating it through a slot 12, and which ad will held in position and place due to the inherent frictional engagement produced by the flexible cover, as the ad is located therein.

Figure 10:
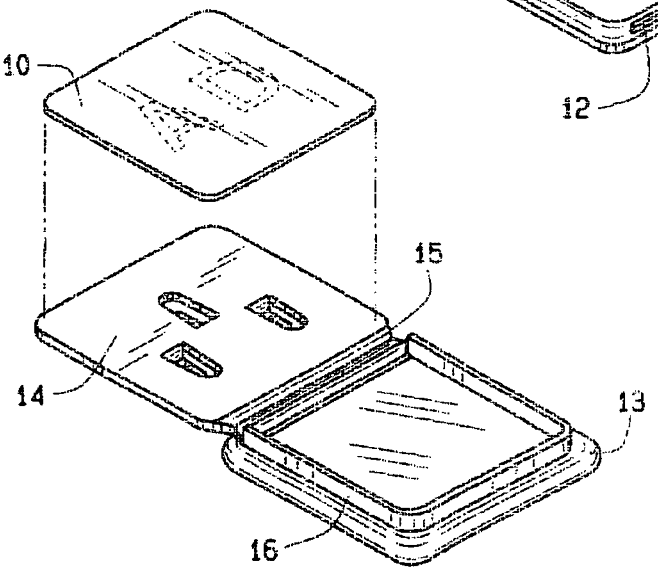
FIG. 10 shows how the transparent cover may be connectible with the advertising platform, to a living hinge, with the ad material shown elevated therefrom before it's installation.

FIG. 10 shows another embodiment how the cover 13 may be formed integrally with the base 14 by hinge means 15, which may be a living hinge, and once the advertising placard 10 is lowered in place, the cover may be pivoted over and tightly adhered to the base 14 by means of the expansiveness of the integral cover lip 16, as can be noted. These are examples of how the concept of this invention comprehends its formation in different manners, but yet achieves the overall purposes for its design, and that is to provide for a very snug holding of a sizeable advertisement onto an integrated platform formed of a nozzle guard, as a promotional inducement to the user of the nozzle to buy other items than just the gasoline being dispensed.

Variations or modifications to the subject matter of this invention may occur to those skilled in the art upon review of the invention as disclosed herein. Such variations, if within the spirit of this invention, are intended to be encompassed within the scope of any claims to patent protection. The summary of the invention as provided herein, its description in the preferred embodiment, and its depiction in the drawings, are set forth for illustrative purposes only.

I claim:

1. A nozzle display integrated into the structure of a nozzle guard, said display having a base that is arranged upwardly from the upper surface of the nozzle guard, a transparent cover sized slightly greater than the dimensions of the display base, said cover having an integral lip extending downwardly around its perimeter, having a dimension narrower than the nozzle guard, said cover and its resilient lip provided for embracing the display base and any advertising display provided therein to hold the advertising readily displayed to the user of the nozzle while dispensing gasoline, said display base includes at least one downwardly extending tab, said at least one tab being integrally formed with the nozzle guard, to assure the base retention to the nozzle guard during sustained usage, and said tab, at least one, is pressed downwardly from said display base during its formation.

2. The nozzle display of claim 1 and wherein the advertisement forms a point-of-purchase display for the benefit of the nozzle user.

3. The nozzle display of claim 1 and wherein said cover attaches with the nozzle display along one side edge thereof by means of a hinge.

4. The nozzle display of claim 3 wherein the hinge holding the cover to the display base comprises a living hinge.

5. The nozzle display of claim 1 wherein said transparent cover includes a slot along one edge, and any advertising display capable of sliding into said slot, when assembled for usage as any advertising display for a fuel dispensing nozzle.

6. The nozzle display of claim 1 wherein at least one of said downwardly extending tabs extend in one direction, and at least one other of the downwardly extending tabs extends in an opposite direction, to assure retention of the nozzle display to the nozzle guard after its formation.

* * * * *